United States Patent

Ryu et al.

[11] Patent Number: 5,881,631
[45] Date of Patent: Mar. 16, 1999

[54] CONNECTION BETWEEN A PISTON AND CONNECTING ROD OF A RECIPROCATING COMPRESSOR

[75] Inventors: Kio Ryu, Chunan; Il Kyo Oh, Suwon, both of Rep. of Korea

[73] Assignee: Samsung Electronics Co., Ltd., Suwon, Rep. of Korea

[21] Appl. No.: 837,414

[22] Filed: Apr. 18, 1997

[30] Foreign Application Priority Data

Apr. 23, 1996 [KR] Rep. of Korea ............... 1996-12429

[51] Int. Cl.$^6$ .................................................. F16J 1/14
[52] U.S. Cl. ........................................ 92/187; 74/579 E
[58] Field of Search .................... 92/172, 187, 188; 74/579 E

[56] References Cited

U.S. PATENT DOCUMENTS

| | | | |
|---|---|---|---|
| 1,530,383 | 3/1925 | Livingood | 92/188 X |
| 4,548,125 | 10/1985 | Huther | 92/187 |
| 4,928,578 | 5/1990 | Rhodes | 92/187 |

FOREIGN PATENT DOCUMENTS

| | | | |
|---|---|---|---|
| 2043226 | 3/1972 | Germany | 92/187 |
| 1032360 | 6/1966 | United Kingdom | 92/187 |

*Primary Examiner*—Hoang Nguyen
*Attorney, Agent, or Firm*—Burns, Doane, Swecker & Mathis, L.L.P.

[57] ABSTRACT

A reciprocating compressor includes a driving motor unit having a crank shaft and a compressor unit having a cylinder. A piston having a piston body reciprocates in the cylinder, and a plate-shaped extension piece extends from the piston body along the axial direction thereof. A connecting rod has a crank pin eye formed on one end thereof into which a crank pin of the crank shaft is inserted, and an U-shaped connector formed on the other end thereof for accommodating the extension piece. A piston pin penetrates the extension piece and the U-shaped connector and connects the piston and the connecting rod to relatively rotate.

4 Claims, 3 Drawing Sheets

CONNECTION BETWEEN A PISTON AND CONNECTING ROD OF A RECIPROCATING COMPRESSOR

BACKGROUND OF THE INVENTION

The present invention relates to a reciprocating compressor including a driving motor unit having a crank shaft and a compressor unit having a cylinder, and more particularly, to a reciprocating type compressor having an improved combination structure between a piston and a connecting rod.

A reciprocating compressor, that is, a hermetic compressor which has been widely used for compressing a coolant, is comprised of an air-tight external housing, a driving motor unit and a compressor unit both of which are installed in the external housing. A crank shaft which is connected with a rotor in the driving motor unit, is connected with a piston accommodated in a cylinder and reciprocated by a connecting rod, thereby converting a rotational force of the crank shaft into a reciprocal movement of the piston. The piston reciprocates in the cylinder to thereby compress fluids such as a coolant flowing into the cylinder.

FIG. 5 is an exploded perspective view showing an example of the connection of a connecting rod and a piston which is adopted in a conventional reciprocating type compressor. FIG. 6 is a sectional view showing an example of the assembly of the connecting rod and the piston thereof. As shown in FIGS. 5 and 6, a larger eye 102 into which an eccentric crank pin 109 of a crank shaft 113 is inserted is formed on one end of a connecting rod 101, and a smaller eye 105 into which a piston pin 104 is inserted is formed on the other end thereof. An insertion hole 106, into which the end of the connecting rod 101 at the side of the smaller eye 105 is inserted, is formed in the piston 103 along the axial direction, which piston has a cylindrical external surface which contacts the inner wall of a cylinder 110. A piston pin hole 107 into which the piston pin 104 is inserted perpendicularly to the axial direction is formed to communicate with the insertion hole 106.

The piston pin 104 is formed as a tubular body, and passes through the piston pin hole 107 of the piston 103 and the smaller eye 105 of the connecting rod 101, to thereby connect the piston 103 and the connecting rod 101 on order to enable them to rotate relatively to each other. To prevent the piston pin 104 from being released from the piston 103 and the connecting rod 101 in the connection state, a fixing pin 108 is inserted into a fixing hole 115 formed on the piston pin 104 perpendicularly to the lengthwise direction thereof via a fixing pin hole 114 formed on the piston 101, to maintain the piston pin 104.

During assembly of the piston 103 and the connecting rod 101, the end of the connecting rod 101 at the side of the smaller eye 105 is at first inserted into the insertion hole 106 of the piston 103, and then the piston pin 104 is inserted into both the piston pin hole 107 formed on the piston 103 and the smaller eye 105 of the connecting rod 101. Then, the fixing pin 108 for preventing the piston pin 104 from being released is inserted into the fixing hole 115 via the fixing pin hole 114, to complete the assembly of the connecting rod 101 and the piston 103.

Meanwhile, in such a conventional reciprocating compressor, since the insertion hole 106 into which the end of the connecting rod 101 is inserted is formed on the piston 103, the length of the piston 103 becomes longer. Accordingly, the surface area of the piston 103 becomes larger and a frictional force between the piston 103 and the inner wall surface of the cylinder 110 increases, which causes the lowering of performance of the compressor. Also, since there are a plurality of such elements as the piston pin hole 107, the smaller eye 105, the insertion hole 106, the fixing pin hole 114 and the fixing hole 115 which require a highly precise fabricating process, the overall manufacturing cost becomes high. Also, since the connection structure between the connecting rod 101 and the piston 103 is relatively complex, it takes much working time to assemble them.

SUMMARY OF THE INVENTION

To solve the above problems, it is an object of the present invention to provide a reciprocating compressor in which the performance of the compressor is improved by reducing a frictional force between a piston and a cylinder, and the connection structure between a connecting rod and the piston is simplified to facilitate a fabrication of the connecting rod and the piston and to shorten the assembly working time.

To accomplish the above object of the present invention, there is provided a reciprocating compressor including a driving motor unit having a crank shaft and a compressor unit having a cylinder, the reciprocating compressor comprising: a piston having a piston body which reciprocates in the cylinder and a plate-shaped extension piece extended from the piston body along the axial direction of the piston body; a connecting rod having a crank pin eye formed on one end thereof into which a crank pin of the crank shaft is inserted, and an U-shaped connector formed on the other end thereof for accommodating the extension piece; and a piston pin which penetrates the extension piece and the U-shaped connector and connects the piston and the connecting rod for relative rotation.

Here, a stop flange extended in the radial direction is formed on one end of the piston pin, and a circumferential groove with which a stop ring is connected is formed on the other end thereof, to thereby fix the piston pin with the stop ring. Otherwise, the piston pin may be fixed by a nut or a cotter pin.

DETAILED DESCRIPTION OF A PREFERRED EMBODIMENT OF THE INVENTION

Preferred embodiments of the present invention will be described with reference to the accompanying drawings.

Figure 1:
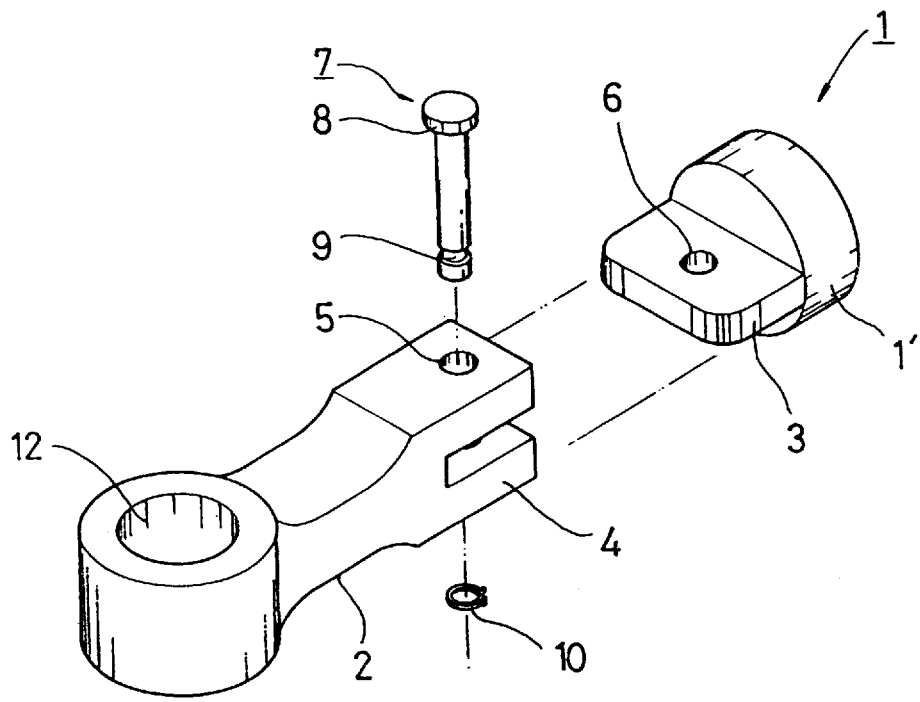
FIG. 1 is an exploded perspective view of a piston and a connecting rod which are adopted in a reciprocating compressor according to a first embodiment of the present invention.
Figure 2:
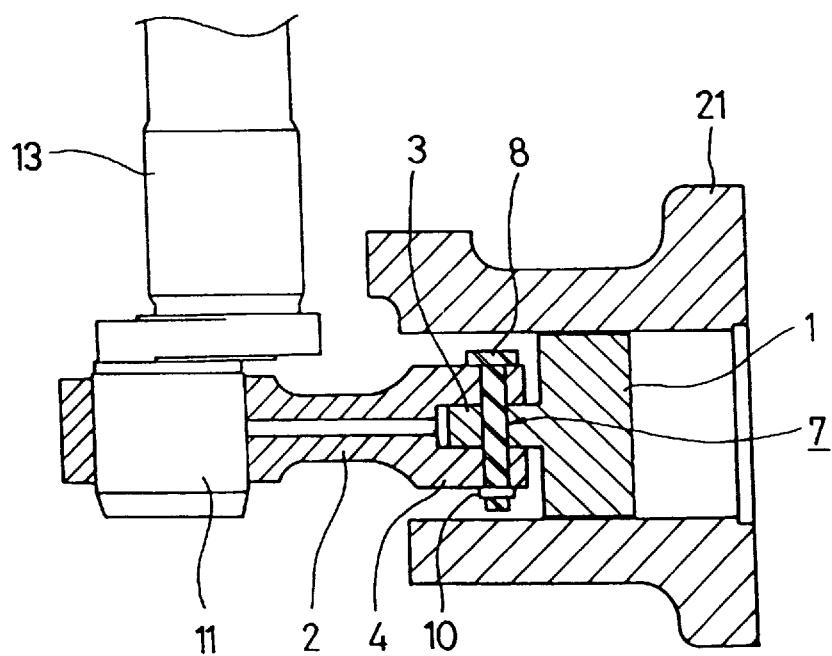
FIG. 2 is a sectional view of the assembled state of the piston and the connecting rod of FIG. 1.

As shown in FIGS. 1 and 2, a piston 1 which reciprocates in a cylinder 21 includes a piston body 1' having a cylindrical external surface which slidably contacts the inner wall surface of the cylinder 21, and a plate-shaped extension piece 3 extended from an end of the piston body 1' along the axial direction thereof. A crank pin eye 12 is formed on one end of a connecting rod 2. An eccentric crank pin 11 of a crank shaft 13 is inserted into the crank pin eye 12. A U-shaped connector 4 which includes two parallel legs, is branched in U-shaped form is formed on the other end of the connecting rod 2 in order to accomodate the extension piece 3 of the piston 1. Piston pin holes 5 and 6 are respectively formed on the U-shaped connector 4 and the extension piece 3 perpendicularly to the axial direction of the U-shaped connector 4 and the extension piece 3, and they are aligned in an assembled state of the connector and extension piece. Thus, a shank of a piston pin 7 simultaneously penetrates the piston pin holes 5 and 6. A stop flange 8 which extends in the radial direction is formed on one end of the shank of the piston pin 7 and directly engages one of the legs of the connector 4, and a circumferential groove 9 with which a stop ring 10 can be connected is informed on the other end of the shank of the piston pin 7.

By this structure, when the piston 1 is connected with the connecting rod 2, the extension piece 3 of the piston 1 is first inserted into a slit of the U-shaped connector 4 of the connecting rod 2, and then the shank of the piston pin 7 is inserted to pass through the piston pin holes 5 and 6 formed on the U-shaped connector 4 and the extension piece 3, respectively. Then, the stop ring 10 is connected with the circumferential groove 9 formed on the shank of the piston pin 7, to prevent the piston pin 7 from being released from the piston pin holes 5 and 6. Accordingly, the piston 1 and the connecting rod 2 can be easily and simply assembled.

As described above, the extension piece 3 of the piston 1 is inserted into the slit of the U-shaped connector 4 of the connecting rod 2 and is simply secured by the piston pin 7. Thus, the number of the working elements requiring a highly precise fabrication or the number of the elements of which fabrication is difficult can be reduced, and the assembly work is facilitated as well. Also, since the piston body 1' can be shorter, the surface area of the piston which slidably contacts the inner wall surface of the cylinder 21 decreases and a frictional resistance is reduced, thereby enhancing a compression efficiency.

Figure 3:
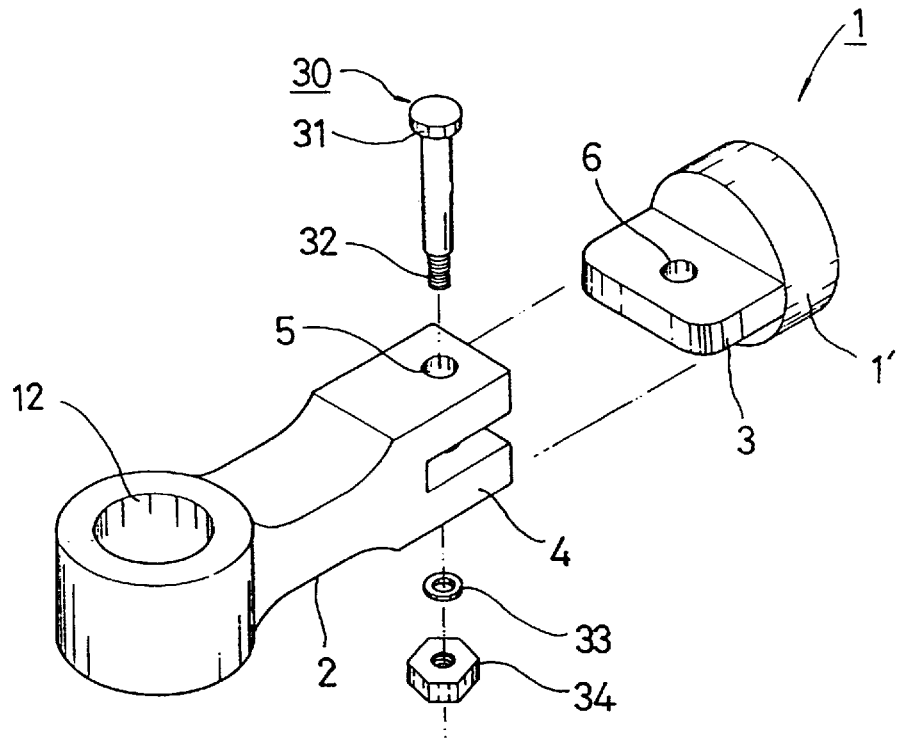
FIGS. 3 and 4 are exploded perspective views of other embodiments according to the present invention in correspondence to FIG. 1, respectively.

FIG. 3 is an exploded perspective view showing another example of a fixing structure for preventing the piston pin from being released. In this embodiment, a shank of a piston pin 30 has a stop flange 31 on one end thereof which extends in the radial direction as in the FIGS. 1 and 2 embodiment. The shank of the piston pin 30 has a male screw portion 32 on the other end thereof, differently from the above-described embodiment. The piston pin 30 is prevented from being released by connecting the male screw portion 32 to a washer 33 and a nut 34, in sequence.

Figure 4:
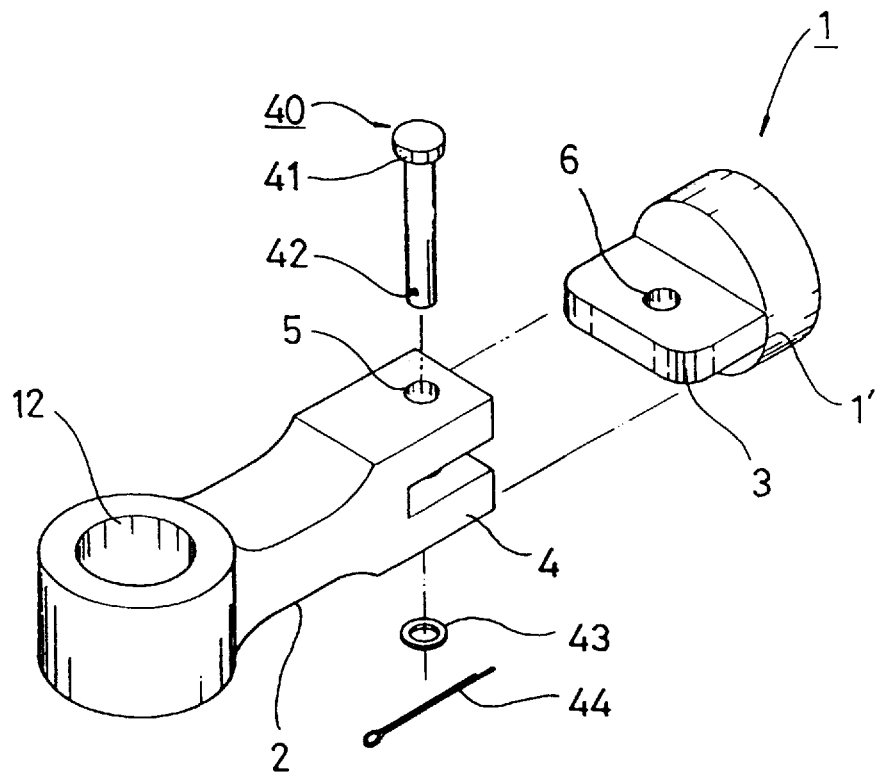
Figure 5:
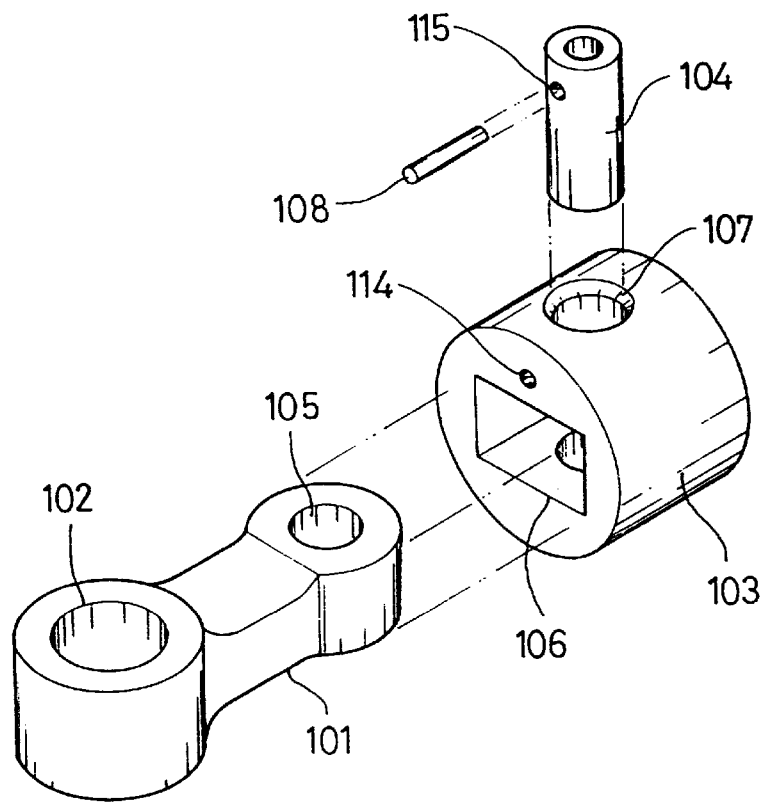
FIG. 5 is an exploded perspective view of a piston and a connecting rod which are adopted in a conventional reciprocating compressor.
Figure 6:
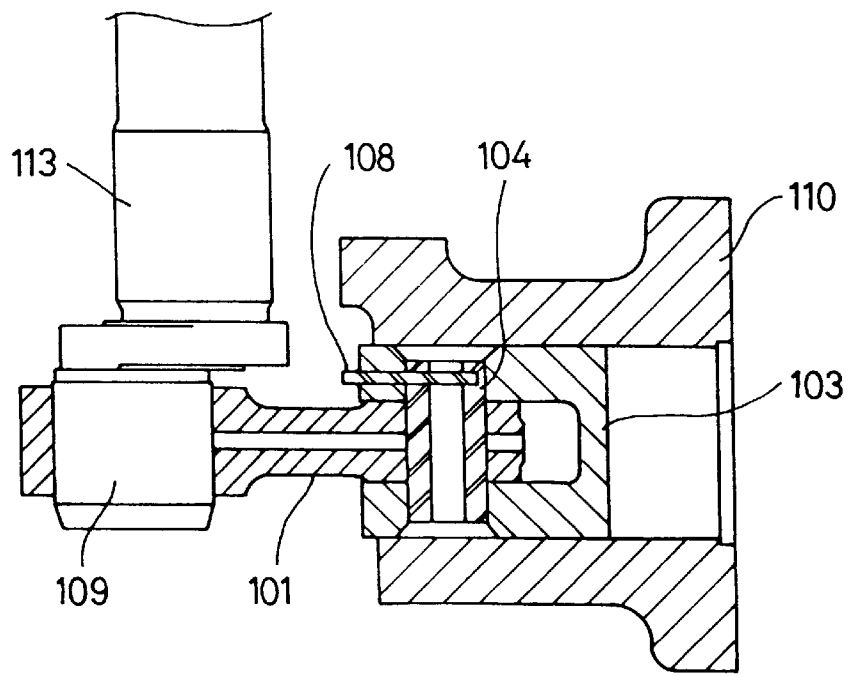
FIG. 6 is a sectional view of the assembled state of the piston and the connecting rod of FIG. 5.

FIG. 4 is an exploded perspective view showing still another embodiment of a fixing structure for preventing the piston pin from being released. In this embodiment, a stop flange 41 which extends in the radial direction is formed on one end of a shank of a piston pin 40, and a cotter pin hole 42 is formed on the other end thereof, to enable a cotter pin 44 to pass through the pin hole 42 perpendicularly to the axial direction of the piston pin 40. A washer 43 is fitted to the piston pin 40 which mutually connects an U-shaped connector 4 of a connecting rod 2 and an extension piece 3 of a piston 1, around the circumferential of the piston pin 40. Also the cotter pin 44 is penetrated into the pin hole 42. Then, the legs of the cotter pin 44 are bent so as to be spaced apart from each other not to be released, to complete an assembly work.

As described above, the present invention reduces a frictional resistance between the piston and the cylinder to enhance performance of the compressor, and simplifies the connection structure between the connecting rod and the piston, thereby facilitating a fabrication and assembly process.

What is claimed is:

1. A reciprocating compressor including a driving motor unit having a crank shaft and a compressor unit having a cylinder, the reciprocating compressor comprising:

a piston having a piston body which reciprocates in said cylinder and a plate-shaped extension piece extended from said piston body along the axial direction thereof, said extension piece including a hole;

a connecting rod having a crank pin eye formed on one end thereof into which a crank pin of said crank shaft is inserted, and a U-shaped connector formed on the other end thereof for accommodating said extension piece, said connector including parallel legs each having a hole;

a piston pin which penetrates said extension piece and said U-shaped connector and connects said piston and said connecting rod for relative rotation, a shank portion of said piston pin extending through said holes of said extension plate and said connector, one end of said piston pin including a flange formed of one integral piece with said shank and extending laterally thereof, said flange being in direct contact with said legs; and a fastener disposed on an opposite end of said shank for retaining said piston pin in said holes.

2. The compressor according to claim 1 wherein said opposite end of said shank has a circumferential groove formed therein, said fastener comprising a stop ring disposed in said groove.

3. The compressor according to claim 1 wherein said piston pin comprises a bolt, said flange comprising a head of said bolt, wherein said opposite end of said shank has a male screw thread formed thereon, said fastener comprising a nut screwed onto said male screw thread.

4. The compressor according to claim 1 wherein said fastener comprises a cotter pin extending through said shank.

* * * * *